United States Patent [19]

Wheeler

[11] Patent Number: 4,764,782
[45] Date of Patent: Aug. 16, 1988

[54] CAMERA DIFFUSER FOR TAKING COMPOSITE PHOTOGRAPHS

[76] Inventor: Alton D. Wheeler, 3940 Fox Meadow La., Pasadena, Tex. 77504

[21] Appl. No.: 128,280

[22] Filed: Dec. 3, 1987

[51] Int. Cl.[4] .................. G03B 15/03; G03B 17/24
[52] U.S. Cl. ................................. 354/109; 354/122; 354/126; 354/295
[58] Field of Search ............... 354/108, 109, 122, 126, 354/295

[56] References Cited

U.S. PATENT DOCUMENTS

| | | | |
|---|---|---|---|
| 3,747,490 | 7/1973 | Brandt | 354/295 X |
| 4,268,144 | 5/1981 | Wheeler | 354/108 |
| 4,639,109 | 1/1987 | Hudspeth | 354/295 |
| 4,719,930 | 1/1988 | Wheeler | 354/108 |

Primary Examiner—Michael L. Gellner
Attorney, Agent, or Firm—Pearne, Gordon, McCoy & Granger

[57] ABSTRACT

Accessories for standard cameras are disclosed which permit the use of a standard camera to produce composite photographs. Two embodiments of the accessory are illustrated. One embodiment is adapted to be removably mounted on a standard camera marketed by the Polaroid Corporation, and designated the Spectra System camera. The other embodiment is adapted to be mounted on a standard camera manufactured by the Polaroid Corporation, and designated the Sun 600 camera. The acessories of both embodiments are easily mounted on and removed from the associated camera without requiring any modification of the standard camera. With both accessories, the associated camera can be used selectively for conventional photography and for producing composite photographs.

19 Claims, 4 Drawing Sheets

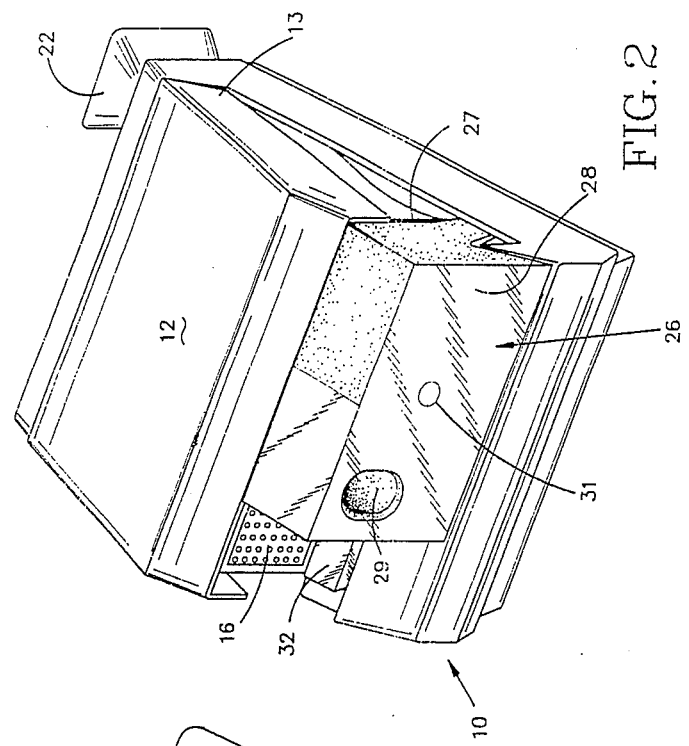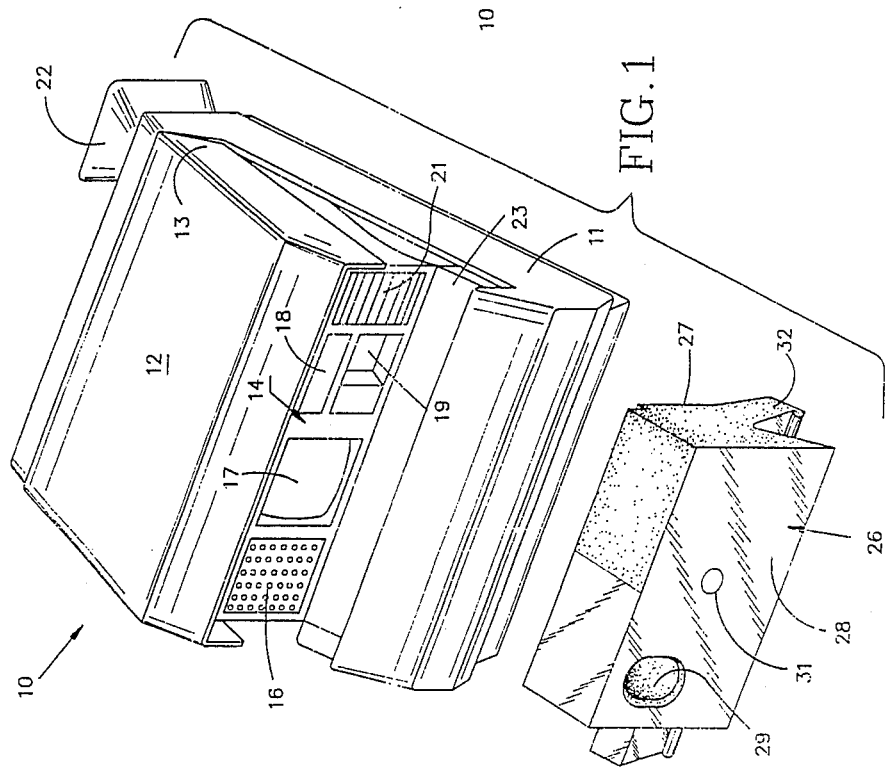

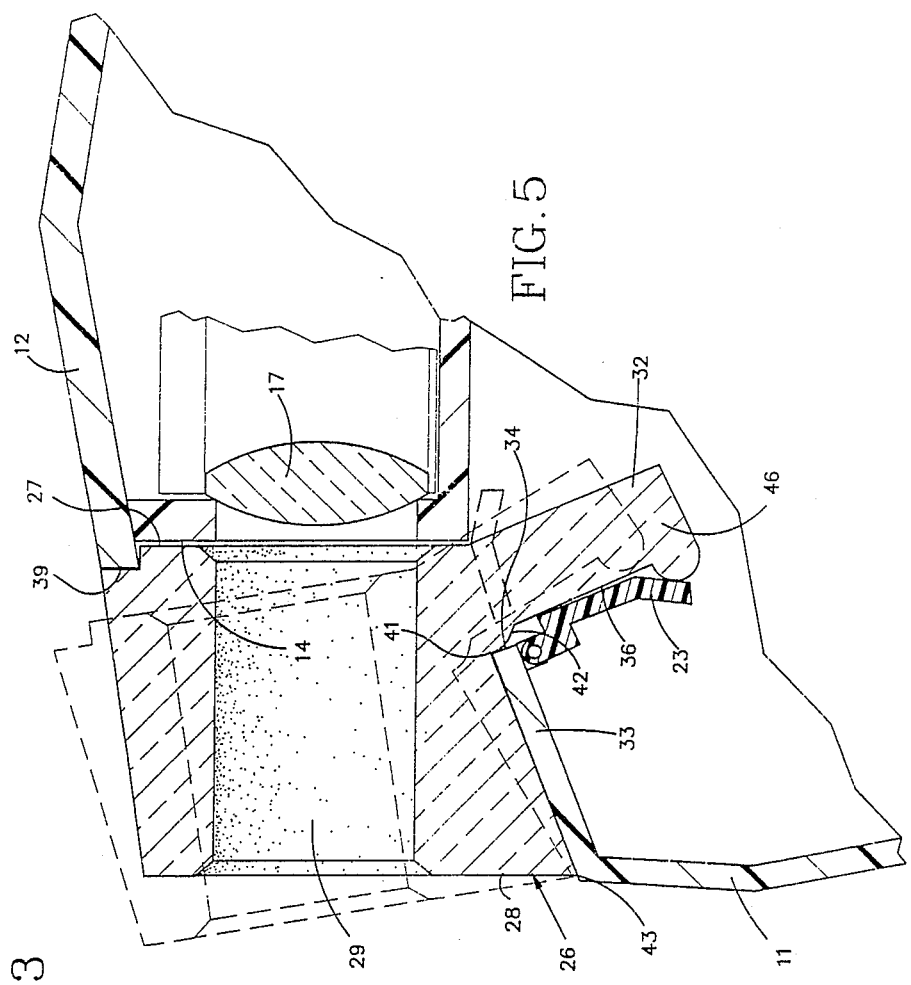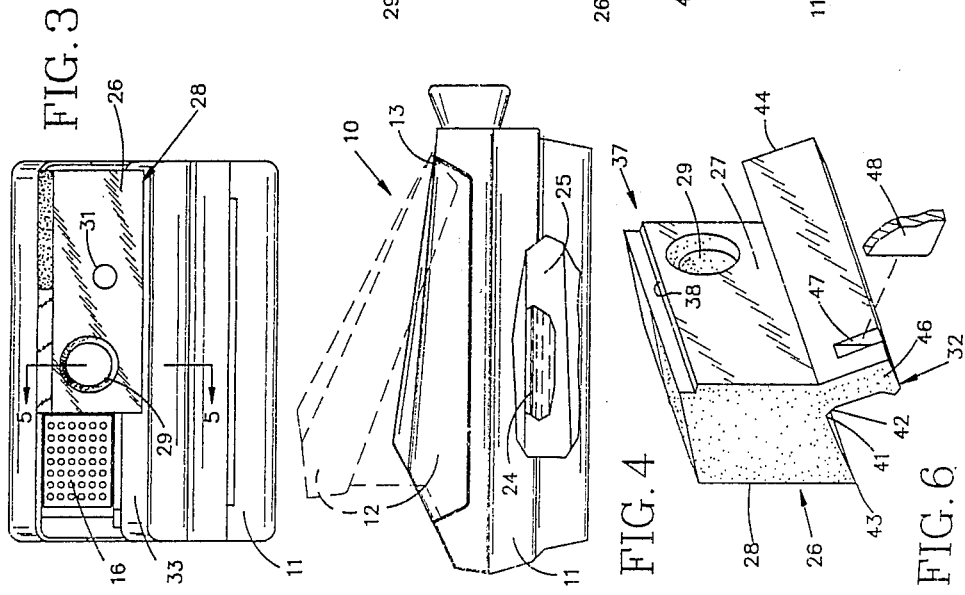

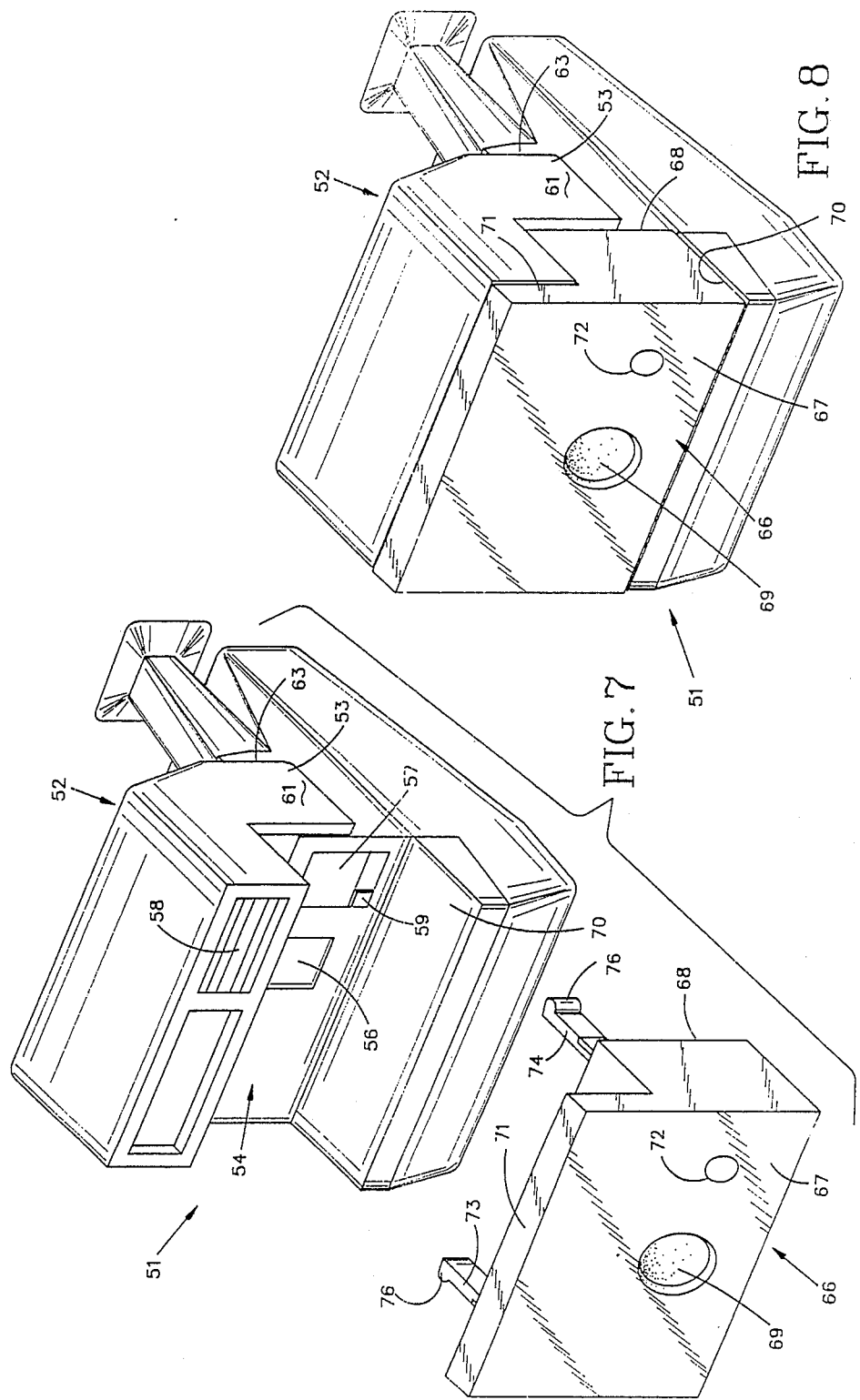

1

CAMERA DIFFUSER FOR TAKING COMPOSITE PHOTOGRAPHS

BACKGROUND OF THE INVENTION

This invention relates generally to a camera diffuser which permits the taking of composite photographs with a standard camera, and more particularly to a novel and improved camera and diffuser combination allowing easy mounting of the diffuser on the camera and subsequent removal therefrom.

PRIOR ART

U.S. Pat. No. 4,268,144 discloses a camera and mask combination which permits the use of a conventional camera to make composite photographs. In the illustrated embodiment, a mask having indicia or graphics thereon is mounted on a film pack in a camera. When the film is exposed, the image being photographed passes through the mask and the finished photograph has the indicia or graphics from the mask superimposed on the image being photographed.

Further, U.S. Pat. No. 4,717,930 discloses a composite photography system which, in addition to a mask on the film pack, provides a diffuser structure to allow an image to reach the film only along a restricted zone thereof, and a mask which provides indicia or graphics along other portions of the film. In such system, the composite photograph provides the photographed image in a selective zone or area of the film and the mask indicia are located over at least a portion of the remainder of the film surface.

The diffuser functions to limit the area of the image being photographed, and also functions to direct light from the camera's flash to the film along the zone of the mask having the indicia thereon. Such redirected light from the flash ensures that sufficient light passes through the mask indicia to reproduce the indicia on the film.

The above-noted pending application discloses the use of an adhesive to secure the diffuser on the camera. Such adhesive mounting is satisfactory for securing the diffuser on the camera. However, it presents problems if the diffuser must be repeatedly removed and reinstalled to permit the camera to be used in a conventional manner on some occasions and to be used to produce composite photographs on other occasions. The above-mentioned letters patent and pending application for letters patent are incorporated herein by reference.

SUMMARY OF THE INVENTION

The present invention provides a novel and improved diffuser camera combination which allows a diffuser to be removably installed on a conventional camera. In accordance with this invention, the diffuser removably locks in its mounted position without the use of adhesive or other permanent or semipermanent connection. Further, the mounting structure requires no modification of the camera structure.

With this invention, the camera can be used for conventional photography and when the user desires to take composite photographs, the mask is installed and the diffuser is quickly and easily mounted on the camera. After the composite photographs are taken, the diffuser and mask are easily removed, returning the camera to its original condition.

Two embodiments of this invention are illustrated. The first embodiment provides a diffuser for use with a conventional camera marketed by the Polaroid Corporation, of Cambridge, Mass., under their designation Spectra System. Such camera provides a body assembly having a cover hinged at the rear of the camera. The cover pivots to a closed position when the camera is not in use. When the camera is to be used, the cover is released and pivots up to an open position. This exposes the front face of the camera containing a lens, a photoflash, a sonic range finder, a view finder, and a light sensing cell.

The diffuser for this camera fits against such front face along the entire surface thereof except for the portion containing the sonic range finder. The diffuser is provided with an opening aligned with the lens through which the image to be photographed passes to the film. This illustrated embodiment is an instant camera, using a film which produces a positive photograph. However, the term "film" as used herein is intended to include other types of film, such as negative film which is subsequently developed and from which prints are made.

When the cover is opened, a small spring-loaded door pivots up to close the gap between the front face and the lower portion of the body.

The diffuser of this embodiment provides a main body portion which, when mounted on the camera, fits against the front face of the camera. Such diffuser is formed of a clear plastic material, such as methylmethacrylate. A mounting projection is also provided which projects into the opening closed by the spring-loaded door. Insertion of the mounting projection causes the door to swing back open. When the mounting projection is inserted into the camera body, it engages a rearwardly facing surface of the body which is exposed when the cover is open. Such engagement holds the adjacent portion of the diffuser against the camera front face.

The diffuser also provides an upper surface which fits under the edge of the camera cover to hold the diffuser in position. Lateral alignment is ensured by opposed lateral walls provided on the mounting projection which engage opposed lateral walls of the camera body.

When it is desired to take composite pictures with the first embodiment, a mask is installed in the film pack of the camera and the diffuser is mounted on the camera, without requiring any adhesive or any modifications of the camera itself. Removal of the diffuser is accomplished easily by merely tipping the diffuser away from the cover edge and lifting the mounting portion up out of the camera. When the diffuser is removed, the spring-loaded door again closes.

U.S. Pat. No. 4,639,109 discloses a filter holder attachment for the same Polaroid Corporation camera which is also removably mounted on such camera.

A second embodiment of this invention is particularly suited for use with another camera being marketed by the Polaroid Corporation, under their designation Sun 600. Such camera provides a body assembly having a cover portion pivotally mounted thereon. Here again, when the cover portion of a housing is folded down, the front face of the camera is enclosed and a relatively compact unit is provided. When the cover portion is raised, the front face of the camera is exposed along with the flash unit. In this particular camera, the front face provides a lens, a view finder, and an exposure control. The flash unit per se is located in the cover. The cover provides rearwardly facing surfaces when the cover is opened, and which are accessible from the front face of the camera between the front face and the flash unit.

The second embodiment of a diffuser in accordance with this invention is also formed of a clear plastic material and is sized to fit against and cover the front face of the camera and also the flash unit. A pair of resilient, rearwardly extending legs are proportioned to extend between the flash unit and the main body of the camera, and are provided with hooked ends which snap behind the associated, rearwardly facing surface on the cover to releasably lock the diffuser in its mounted position. Lateral alignment is ensured because the two rearwardly extending legs extend along the inner sides of the cover to ensure exact lateral alignment of the diffuser on the camera.

When it is desired to remove the diffuser from the camera, the rearwardly extending legs are pressed inwardly a small amount so that the hooked ends are released from the rearwardly facing surfaces and the diffuser is pulled forwardly off the camera.

U.S. Pat. No. 4,707,106 discloses an accessory which can be removably mounted on the same type of camera.

In both embodiments, a conventional camera is easily modified to take composite photographs, and can be easily returned to its original condition.

These and other aspects of this invention are illustrated in the accompanying drawings, and are more fully described in the following specification.

BRIEF DESCRIPTION OF THE DRAWINGS

FIG. 1 is a perspective view of a camera and diffuser in accordance with the first embodiment of this invention before the installation of the diffuser on the camera.

FIG. 2 is a view similar to FIG. 1, but illustrating the diffuser in its mounted position.

FIG. 3 is a front view of the camera with the diffuser mounted thereon.

FIG. 4 is a side view of the camera, with the cover in its closed position and illustrating in phantom the manner in which the cover pivots up to expose the front face of the camera.

FIG. 5 is a fragmentary cross section taken along line 5—5 of FIG. 3, illustrating the manner in which the mounting projection of the diffuser fits down into the body of the camera and how the upwardly facing surface of the diffuser fits under the forward edge of the camera cover. This figure also illustrates in phantom the diffuser in an intermediate position of its installation.

FIG. 6 is a perspective view of a diffuser and a portion of the camera body which fits into a notch provided in the mounting portion to ensure lateral alignment of the diffuser on the camera.

FIG. 7 is an exploded view of a camera and diffuser in accordance with the second embodiment of this invention, illustrating the diffuser before its installation on the camera.

FIG. 8 is a view similar to FIG. 7, but illustrating the diffuser mounted on the camera.

DETAILED DESCRIPTION OF THE DRAWINGS

Figure 10:
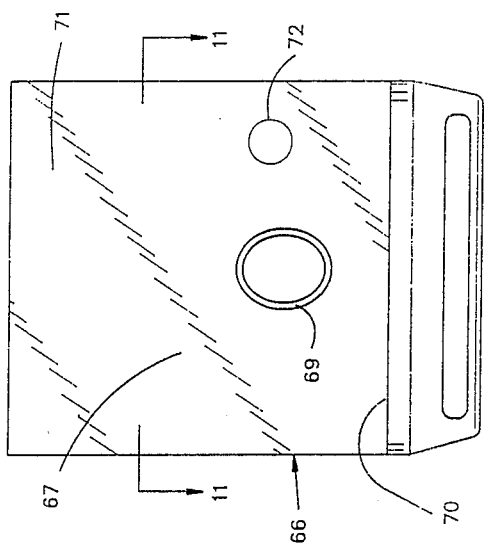
FIG. 10 is a front view of the camera and diffuser.

FIGS. 1 through 6 illustrate the first embodiment of this invention, in which the diffuser is combined with a Spectra System camera, marketed by the Polaroid Corporation. As illustrated in FIG. 4, the housing assembly 10 includes a lower housing unit 11 and a cover 12 hinged at 13 for pivotal movement between a closed position illustrated in full-line and an open position illustrated in phantom. A film pack 25 is located in the lower housing unit. When used to produce composite photographs, a mask 24 is mounted in the film pack 25. The front face 14 of the camera is carried by the cover 12. When the camera is closed, the front face is enclosed within the housing assembly, and is protected. When the camera is opened, the front face is exposed and the camera is in its operative position.

Located within the front face 14 of the camera is a sonar type range finder 16, the lens system for the camera 17, a light sensing photocell 18, the forward end of the view finder 19, and a photoflash 21. The view finder eyepiece 22 is at the rearward end of the housing assembly 10. A hinged door 23 is pivotally mounted along its forward edge on the lower housing unit 11 and is spring-loaded so that it swings up when the camera is opened to close a gap between the lower housing unit 10 and the front face 14.

In FIG. 1, the camera is illustrated in its opened and its normal operative condition, in which it can be used to take photographs in the conventional manner.

Also illustrated in FIG. 1 is a diffuser 26 structured to be removably mounted on the camera, as discussed in greater detail below. The diffuser 26 is preferably formed of a clear plastic material, such as methylmethacrylate, and, when installed, covers the entire front face 14 of the camera except for the range finder 16.

The diffuser 26, best illustrated in FIGS. 1 and 6, provides a rearward planar face 27 which actually fits against the front face 14 of the camera and a forward planar face 28. The two faces 27 and 28 are parallel so that the image seen through the view finder is not distorted, and the view finder can continue to be used to properly orient the camera. An oval opening 29 is formed in the diffuser in alignment with the lens 17 to provide a clear passage for the image being photographed through the diffuser. The opening 29 is sized so that the image passing therethrough only covers a portion of the film being exposed which normally corresponds to the clear portion of the mask 24 positioned within the film pack 25.

The manner in which the diffuser functions in combination with the mask 24 is described in detail in the copending application Ser. No. 918,718, incorporated by reference, supra, and reference should be made to such application for a more detailed description of the diffuser mask operation. A circle 31 is inscribed in the front face of the diffuser which is aligned with the view finder 19 to provide the user with an indication of the portion of the image which will pass through the opening 29 to the film.

In order to removably mount the diffuser on the camera, the diffuser is provided with a downwardly and rearwardly inclined projection 32 proportioned to extend down into the body assembly through the opening closed by the door 23, as best illustrated in FIG. 5. Insertion of the projection causes the spring-loaded door 23 to swing open as the diffuser 26 is installed. During installation, the projection 32 is positioned in an opening between the front face 14 and a rearwardly extending wall or deck 33 provided by the lower housing unit 11.

The end of the wall or deck 33 provides a rearwardly facing surface 34 along which the forward face 36 of the projection moves until the diffuser reaches the phantom line position illustrated in FIG. 5. As the diffuser is moved beyond the phantom line position to the fully mounted position illustrated in full line in FIG. 5, the rearward face 27 moves to a position against the forward face 14 of the camera.

The diffuser is also provided with a recess 37 providing an upwardly facing surface 38 which fits below the forward edge 39 of the cover 12. In the fully mounted position, the rearward face 27 of the diffuser is held against the forward face 14 of the camera by the engagement between the surface 34 of the wall 33 and a mating surface 41 on the diffuser. The projection is formed with an inclined camming surface 42 which cams the diffuser rearwardly as the diffuser is installed and guides the mating surface 41 into position when the surface 38 is positioned under the forward edge 39 of the cover 12.

The forward edge 43 of the diffuser engages the forward end of the wall 33 as the diffuser is moved to its fully installed position, so that the last portion of the movement occurs with a pivot-like movement. Since the engagement between the surface 38 and the edge 39 of the cover is rearwardly located with respect to the engagement between the edge 43 and the wall 33, it resists pivotal movement of the diffuser toward its release position and effectively retains the diffuser in its mounted position on the camera. However, when it is desired to remove the diffuser from the camera, it is merely necessary to exert a light force to pull the surface 38 out from underneath the edge 39, after which the diffuser is merely lifted away from the camera, causing the projection 32 to move up out of the opening in the camera housing. During installation and removal, the forward end of the cover is deflected upward a slight amount to permit the upwardly facing surface 38 to pass under the edge 39.

Lateral alignment of the diffuser and camera is provided by engagement between the ends 44 and 46 of the projection 32 and adjacent side walls provided by the housing. Also, the projection 32 is provided with a notch 47 which fits over a projecting wall 48 extending down from the cover. The interfitting of the projection 48 and the notch 47 also ensures lateral alignment between the diffuser and the camera itself.

When the user wishes to use the camera for conventional photography, the diffuser and the mask are not installed. However, when it is desired to take composite photographs, it is merely necessary to install the mask 24 in the film pack 25 and to snap the diffuser into its installed position. Subsequently, when conventional photographs are again desired, the diffuser and mask are removed. The installation and the removal of the diffuser can be accomplished with complete ease and if it is desired to close the camera temporarily, the diffuser is merely removed, allowing the camera to be closed in the usual manner. Because the diffuser can be removably mounted on the camera without any modifications to the camera, it can be easily installed on any conventional Spectra System cameras.

A second embodiment of this invention is illustrated in FIGS. 7 through 11. In this embodiment, a diffuser is structured for installation on a Sun 600 camera marketed by the Polaroid Corporation. The camera of this embodiment is provided with a housing assembly 51, including a lower housing unit and a cover 52 pivoted at 53 for movement between an operative position illustrated in full line in the drawings and a closed position illustrated in phantom in FIG. 9.

In the closed position, the cover encloses the forward face 54 of the camera, which contains the lens 56, the forward end of the view finder 57, and a light sensing photocell 59. The photoflash 58 is mounted within the cover and is open to the front of the camera when the cover is pivoted to its open position, best illustrated in FIG. 7. When the cover is closed in the phantom-line position of FIG. 9, the lens 56, view finder 57, flash unit 58, and the photocell 59 are protected from damage. However, they are exposed, and in their operative position, as soon as the cover is raised to the open position of FIG. 7.

Figure 9:
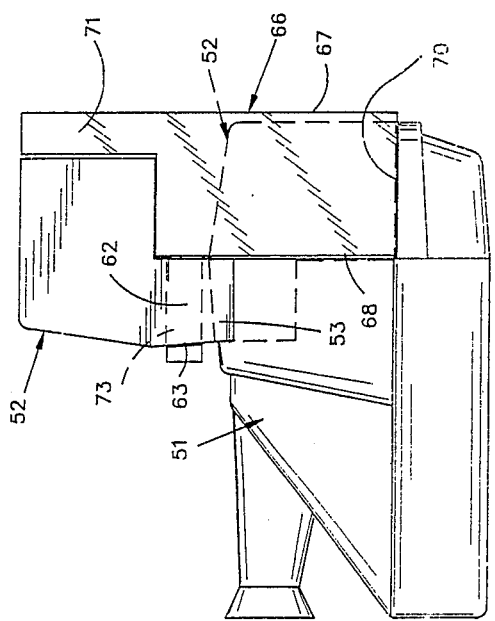
FIG. 9 is a side elevation of the camera and diffuser illustrated in FIG. 8.
Figure 11:
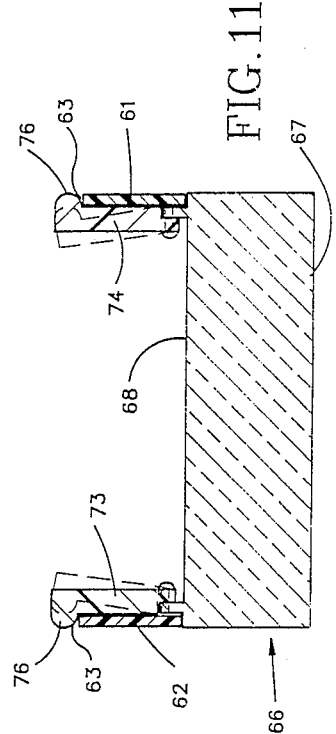
FIG. 11 is a fragmentary, cross section taken along line 11—11 of FIG. 10.

When the cover is in the open position in this embodiment, the flash unit 52 is spaced above the lower housing unit 51 by similar and opposed parallel legs 61 and 62, illustrated in FIGS. 7, 9, and 11. Such legs provide a rearward edge or surface 63 utilized to removably secure the diffuser of this embodiment in its installed position.

In this embodiment, a diffuser 66 is again formed of a clear plastic material such as methylmethacrylate, and is provided with a forward surface 67 and a rearward surface 68 which are parallel to each other so that the view finder can be used without distortion.

Here again, the diffuser 66 is provided with an oval opening 69 aligned with the lens 56 and sized to restrict the image being photographed so that only a portion of the film is exposed to the image passing through the opening 69. When installed as illustrated in FIGS. 8, 9, and 10, the rearward surface 68 of the diffuser fits against the front face 54 of the camera and between a deck 70 and the lower surface of the flash unit. This ensures proper vertical alignment of the diffuser and the camera. An offset portion 71 fits against the flash unit 58. A viewing circle 72 is provided in alignment with the view finder 57 to provide the user with an indication of the portion of the image which is allowed to pass through the opening 69 to the film.

In this embodiment, a pair of resilient, rearwardly extending arms 73 and 74 are mounted on the rearward side of the diffuser and project between the legs 61 and 62 when the diffuser is mounted. Each of the arms 73 and 74 is provided with an outwardly extending, hooked portion 76 which snaps out into engagement with the rearward edge 63 of the legs 61 and 62 to releasably secure the diffuser in its mounted position.

When it is desired to mount the diffuser, the arms 73 and 74 are merely deflected inwardly a slight amount so that the hooked portions pass between the legs 61 and 62 and the diffuser is moved rearwardly until the installed position is reached. The hooked portions 76 then snap in behind the rearwardly facing surfaces 63 to secure the diffuser in its mounted position.

When it is desired to remove the diffuser, it is merely necessary to press inwardly on the hooked portions of the arms 73 and 74 and pull the diffuser forward away from the camera. Proper lateral positioning of the diffuser on the camera is ensured by the engagement of the arms 73 and 74 with the inner, opposed surfaces of the legs 61 and 62.

Here again, a diffuser is provided which can be easily installed or removed from the camera without requiring the modification of the camera in any way. Consequently, a standard camera may be used for standard photography and when composite photographs are desired, it is merely necessary to install a mask in the film pack, in the same manner illustrated in the first embodiment, and install the diffuser. When the mask and diffuser are removed, the camera can be used for conventional photography. In both embodiments, the locking of the diffuser on the camera is accomplished by engagement between a rearwardly facing surface of the housing assembly of the camera, which is positioned for use in locking the diffuser when the cover of the camera is opened.

Further, both embodiments are structured so that the diffuser can be mounted in only one position on the camera, which is the correct position for use.

Although the preferred embodiments of this invention have been shown and described, it should be understood that various modifications and rearrangements of the parts may be resorted to without departing from the scope of the invention as disclosed and claimed herein.

What is claimed is:

1. A camera accessory adapted to be removably mounted on a standard camera having a substantially planar front face, a deck extending forwardly from said front face along one side thereof, a rearwardly facing surface along the edge of said deck adjacent to said front face, and a projection providing a downwardly facing surface adjacent the opposite side of said front face substantially adjacent to the plane of said front face, said accessory comprising a body providing a rearward surface adapted to be positioned against said front face of said camera, a forwardly facing surface adapted to engage said rearwardly facing surface of said camera, a forward surface adapted to engage said deck at a location substantially spaced forwardly from said front face of said camera, and an upwardly facing surface adapted to engage said downwardly facing surface of said camera, said forward surface cooperating with said upwardly facing surface to maintain said forwardly facing surface in engagement with said rearwardly facing surface of said camera when said accessory is mounted on said camera, said accessory being removably mountable on said camera without modifying the structure of said camera.

2. A camera accessory as set forth in claim 1, wherein said accessory is adapted to be mounted on said camera and removed therefrom by pivotal movement with respect to said forward surface to position said upwardly facing surface in engagement with said downwardly facing surface of said camera.

3. A camera accessory as set forth in claim 2, wherein said accessory provides a camming surface operating to cam said accessory toward said front face as said accessory is pivoted to its mounted position.

4. A camera and accessory combination comprising a camera having a substantially planar front face, a deck extending forwardly from said front face along one side thereof, a rearwardly facing surface along the edge of said deck adjacent said front face, and a projection providing a downwardly facing surface adjacent the opposite side of said front face substantially adjacent to the plane of said front face, said accessory being removably mounted on said camera and providing a body having a rearwardly facing surface engaging said front face, a forwardly facing surface engaging said rearwardly facing surface, a forward surface engaging said deck at a location substantially spaced forward from said front face, and an upwardly facing surface engaging said downwardly facing surface, said forward surface cooperating with said upwardly facing surface to maintain said forwardly facing surface in engagement with said rearwardly facing surface, said accessory being removably mounted on said camera without modifying the structure of said camera.

5. A camera and accessory combination as set forth in claim 4, wherein said camera provides a gap between said front face and said rearwardly facing surface, and said accessory provides a projection extending into said gap and providing said forwardly facing surface of said accessory.

6. A camera and accessory combination as set forth in claim 5, wherein said camera provides opposed laterally facing surfaces, and said projection provides opposed laterally facing surfaces engaging said laterally facing surfaces of said camera to laterally position said accessory with respect to said camera.

7. A camera and accessory combination as set forth in claim 6, wherein during mounting and removal of said accessory on said camera said accessory moves with respect to said camera with a pivotal movement around the engagement of said forward surface and said deck.

8. A camera and accessory combination as set forth in claim 7, wherein said downwardly facing surface is displaced slightly from its normal position when said accessory is pivoted into and out of its mounted position.

9. A camera and accessory combination as set forth in claim 8, wherein said projection is provided with a camming surface which moves said accessory into engagement with said front face as said accessory is pivoted to said mounting position.

10. A camera and accessory combination as set forth in claim 9, wherein said camera provides a film with a mask thereon, and said accessory is a diffuser operable in combination with said mask to produce composite photographs.

11. An accessory adapted to be removably mounted on a standard camera having a housing providing a substantially planar front face, a deck extending forwardly from said front face along one side thereof, a flash unit spaced from said housing on the other side of said front face and connected thereto by laterally spaced substantially parallel legs, said legs providing rearwardly facing surfaces, said accessory comprising a body adapted to be mounted against said front face and a pair of laterally spaced arms projecting rearwardly therefrom, said arms being adapted to extend along opposed sides of said legs to laterally position said accessory, and said arms providing forwardly facing surfaces adapted to engage said rearwardly facing surfaces of said legs to hold said body against said front face, said accessory being adapted to be removably mounted on said camera without modifying the structure of said camera.

12. An accessory as set forth in claim 11, wherein the ends of said arms remote from said body are laterally movable to engage and disengage said forwardly facing surfaces thereof with said rearwardly facing surfaces of said legs.

13. An accessory as set forth in claim 12, wherein said arms are resilient.

14. An accessory as set forth in claim 13, wherein said flash unit provides a downwardly facing surface along the other side of said front face, and said body is adapted to engage said downwardly facing surface of said flash unit and said deck to vertically position said accessory with respect to said camera.

15. An accessory as set forth in claim 14, wherein said body is a diffuser adapted to modify said camera for producing composite photographs, and said body includes a portion aligned with said flash unit operable to direct light from said flash unit to film in said camera.

16. An accessory and camera combination comprising a standard camera having a housing providing a substantially planar front face, a deck extending forwardly from said front face along one side thereof, and a flash unit spaced from said housing along the other side of said front face, said flash unit being connected to said housing by laterally spaced substantially parallel legs, said legs providing rearwardly facing surfaces, said accessory providing a body removably mounted against said front face and a pair of laterally spaced arms projecting rearwardly therefrom, said arms extending along opposed sides of said legs to laterally position said accessory with respect to said front face and providing ends, said ends providing forwardly facing surfaces engaging said rearwardly facing surfaces of said legs and removably mounting said accessory on said camera without requiring modification of said standard camera.

17. An accessory and camera combination as set forth in claim 16, wherein said ends of said arms provide hook portions and are resilient and laterally deflectable for moving said forwardly facing surfaces of said arms into and out of engagement with said rearwardly facing surfaces of said legs.

18. An accessory and camera combination as set forth in claim 17, wherein said camera provides a film with a mask positioned thereon, and said body is a diffuser operable in combination with said mask to produce composite photographs on said film.

19. An accessory and camera combination as set forth in claim 18, wherein said body provides a portion extending over said flash unit operable to direct light from said flash unit to portions of said mask.

* * * * *